United States Patent [19]

Pailler

[11] Patent Number: 4,907,443

[45] Date of Patent: Mar. 13, 1990

[54] PROCESS AND APPARATUS FOR MONITORING THE PRESSURE PREVAILING IN A VESSEL OR RECEPTACLE

[75] Inventor: André Pailler, Miribel, France

[73] Assignee: Mutec Ingenierie, Caluire, France

[21] Appl. No.: 250,089

[22] Filed: Sep. 28, 1988

[30] Foreign Application Priority Data

Sep. 29, 1987 [FR] France .............................. 87 13697

[51] Int. Cl.[4] .................... G01N 21/00; G01L 9/00
[52] U.S. Cl. ............................................. 73/52; 73/705
[58] Field of Search .................. 73/705, 52; 358/101, 358/107; 250/231 P, 223 B; 356/240

[56] References Cited

U.S. PATENT DOCUMENTS

| 4,499,373 | 2/1985 | Johnston .......................... 73/705 |
| 4,606,635 | 8/1986 | Miyazawa et al. .............. 250/223 B |
| 4,735,508 | 4/1988 | Bellio ................................. 73/52 |

FOREIGN PATENT DOCUMENTS

| 274179 | 5/1965 | Australia ......................... 250/223 B |
| 2916361 | 11/1980 | Fed. Rep. of Germany ...... 358/101 |
| 125890 | 11/1978 | Japan ................................. 73/52 |
| 21790 | 2/1979 | Japan ................................. 73/52 |
| 18428 | 1/1984 | Japan ............................... 73/705 |
| 1014763 | 12/1965 | United Kingdom . |
| 1469240 | 4/1977 | United Kingdom . |

OTHER PUBLICATIONS

Willard E. Buck et al., "Dynamic Pressure Measurement by Optical Interference", *The Review of Scientific Instruments*, vol. 19, No. 10, Oct. 1948, pp. 678–684.
Japanese Patent Abstract, vol. 9, No. 323 (P-414)[2046], Dec. 18, 1985.

*Primary Examiner*—Hezron E. Williams
*Attorney, Agent, or Firm*—Oliff & Berridge

[57] ABSTRACT

In a purely optical process for monitoring the pressure prevailing in a container without contact with the container, the cap of the container is illuminated by an incident beam and a reflected monitoring beam is obtained; the latter is intercepted by a diffusing support, making it possible to obtain a spot of light observed by a linear video camera. The video signal representing the pressure, after conversion into an electric output signal, makes it possible to monitor or measure continuously the pressure in the container.

13 Claims, 2 Drawing Sheets

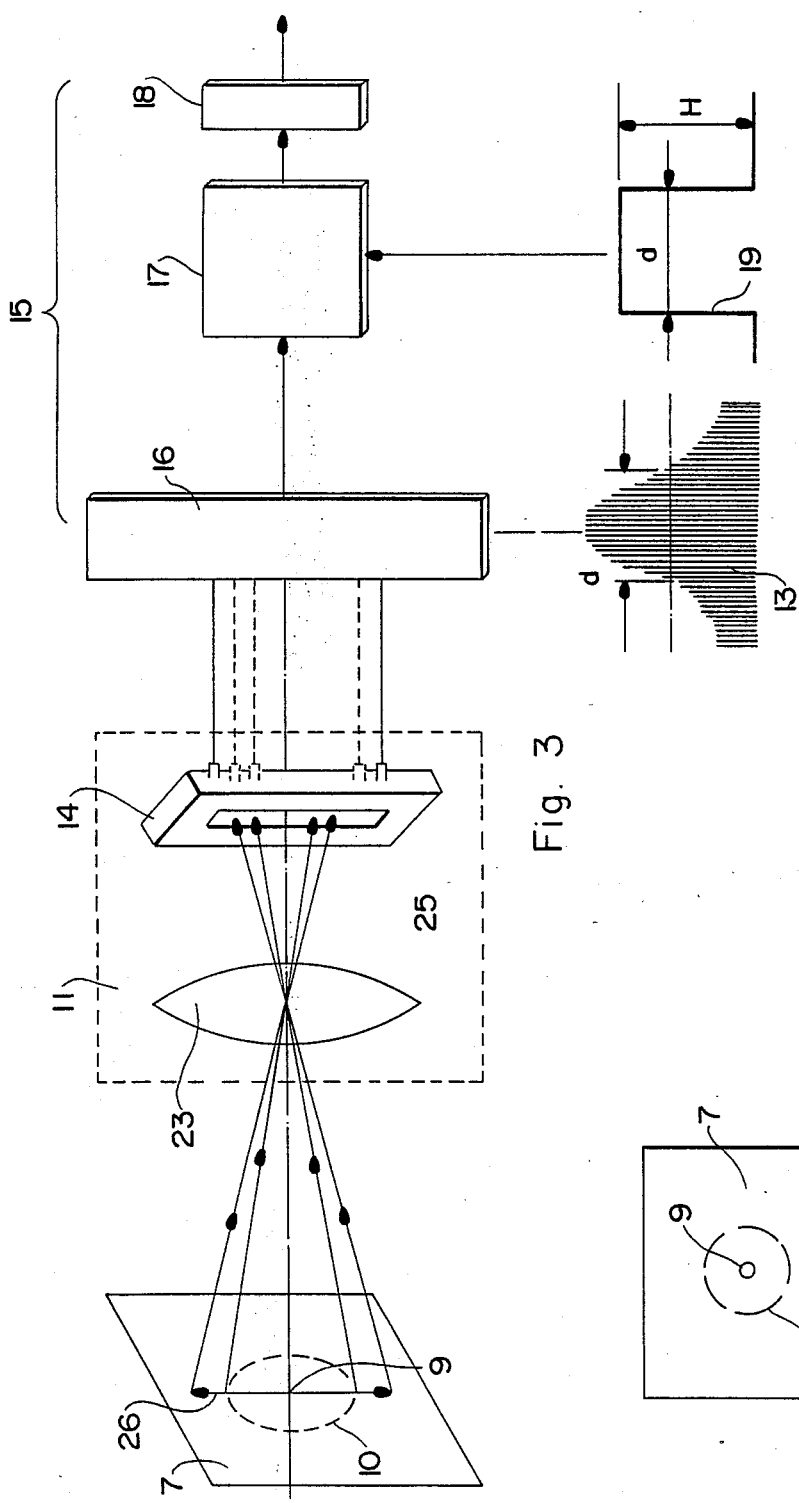

PROCESS AND APPARATUS FOR MONITORING THE PRESSURE PREVAILING IN A VESSEL OR RECEPTACLE

FIELD OF THE INVENTION

The present invention relates to monitoring of the pressure prevailing in a vessel or receptacle, and more generally the difference in pressure between the interior of the latter and the outside.

The phrase monitoring a pressure refers to any physical process making it possible to monitor the presence or absence of pressure or a difference in pressure, and/or to measure the pressure. This monitoring results in a signal which can be processed or converted into another signal, for example an electric signal, and which serves various purposes, such as control of automatic operation, detection of containers which are defective in respect of their internal pressure, and so on.

A preferential, but not exclusive, field of application of the present invention relates to the continuous monitoring, for example on a conveyor, of rigid containers of the glass bottle type, closed by a cap, for example a screw cap, and containing a food product, for example a pasteurized fruit juice, under partial vacuum.

PRIOR ART

Containers of this kind generally have either a substantially flat cap which is deformed to form a hollow, that is to say assuming a concave curvature, through the action of the partial vacuum, or a cap having a so-called "flip" diaphragm assuming only two positions, one outwardly concave through the action of the partial vacuum and the other convex through the action of the atmospheric or ambient pressure.

In order to monitor the existence or the value of the partial vacuum existing in such containers, which are continuously treated in an industrial environment on a conveyor, it has already been proposed to integrate the caps, such as those defined above, into an optical processing chain, making it possible to obtain an optical signal representing the partial vacuum without contact with or measurements on the containers themselves.

Thus, according to the patent GB-C-No. 1,469,240, in the case of containers under partial vacuum as defined above, the cap of each rigid walled container forms or incorporates a substantially flat monitoring member separating the interior of the container from the outside and adapted to curve through the action of said difference in pressure between the interior of the container and the outside. This particular case relates to a substantially flat surface assuming an outwardly concave curvature through the action of the partial vacuum. The optical processing comprises the following stages:

(a) an incident light beam is directed from a light source onto the monitoring member or cap, which transmits a reflected light beam;

(b) the light beam reflected by the cap constitutes the monitoring beam, it being understood that the latter could be obtained from the refracted beam in the case of a transparent cap;

(c) the monitoring parameter selected is the luminous intensity of the monitoring beam at a reference focal point determined by a pre-established value of the partial vacuum; this intensity is maximum at that point, taking into account the concavity assumed by the cap for the pre-established value of the partial vacuum, and this intensity is minimum for a completely flat cap, taking into account the parallelism or corresponding dispersion of the reflected monitoring beam;

(d) with the aid of a photosensitive element, for example a photoelectric cell, the luminous intensity at the reference focal point is detected, its value representing the pressure prevailing in the container.

This luminous intensity is then used as a monitoring signal for appropriate electronic processing to detect defective containers and to remove them from the conveyor.

According to the patent GB-C-No. 1,014,763 a monitoring method of the same type has been proposed for cases where the containers are equipped with a cap having a "flip", that is to say having a pressure dependent bistable diaphragm. In contrast to the method according to the patent GB-C-No. 1,469,240, in this case the monitoring beam is obtained from the reflected beam by partial masking and optical processing of said beam; the luminous intensity of this beam is either zero in the concave position of the flip (partial vacuum), taking into account the masking of the convergent reflected beam, or maximum in the convex position of the flip (absence of partial vacuum), taking into account the divergence of the reflected beam and its optical processing for convergence towards a focal point, where the reflected luminous intensity is measured. In this case moreover the maximum monitoring signal (luminous intensity) is reserved for detection of defective containers; negative monitoring is thus applied, in contrast to the positive monitoring according to the patent GB-C-No. 1,469,240.

Neither of these methods makes it possible to obtain effective monitoring in an industrial environment, particularly by means of continuous treatment of the containers monitored on a conveyor, for the following reasons.

Firstly, the reflectivity of a cap is not a parameter which is monitored during its manufacture. In addition, various colored or uncolored inscriptions appear on the cap, with random effective positioning relative to the axis of the container, in the field of the incident or reflected beam. These disturb the regularity of the monitoring beam (the homongeneous distribution of its luminous intensity if the latter is the monitoring parameter applied), and this occurs in a completely random manner. Finally, the partial vacuum level in each container is not constant in industrial production. For this first group of reasons, even assuming that the container is completely motionless at the moment when the monitoring or measurement takes place, the transducer receives an optical signal identical to a variable image of the cap, which cannot be utilized by the transducer because of its irregular, random shape.

Secondly, various disturbances may substantially impair the position of the homogeneity in space of the optical monitoring signal, for example the location of this signal at the reference focal point designated for the detection of the luminous intensity of said signal:

because they are being carried on a conveyor, the containers are never aligned regularly one behind the other in relation to the nominal conveying direction; only a part of the cap can serve as flat monitoring member forming part of the optical processing chain;

the containers, particularly those of glass, may vary in height because of relatively wide manufacturing tolerances in the bottle manufacturing industry; consequently, the focal point may be displaced to the front or rear of the reference focal point;

in respect of the reference partial pressure, the cap has random curvature because of its mechanical strength;

finally, the vibration entailed by the operation of the conveyor displaces the effective focal point to one side or the other of the reference focal point.

All this has in practice the result that the transducer or receiver receives an optical signal whose shape is either too coarse or too fine in relation to the type of transducer used.

Taking into account this dispersion of the monitoring light signal in relation to the reference focal point, the patent GB-C-No. 1 014 763 proposed to dispose a series of photoelectric cells aligned in a plane at right angles to the axis of the monitoring beam and passing through the reference focal point, each cell being connected in parallel to a receiver; there are in fact at present available arrays of aligned elementary photoelectric cells of the CCD (charge-coupled device) type permitting relatively fine resolution, taking into account the relatively slight width of each cell, which is for example of the order of ten to thirteen microns. The arrangement of an array of this kind directly in the reference focal plane likewise does not make it possible to avoid the disturbances of the monitoring signal which have been observed. The non-linearity of the signal is in fact incompatible with an analysis of the intensity of the monitoring signal.

With regard to CCD components of the matrix type, that is to say whose photoelectric cells are distributed in two dimensions, their relatively short exposure time, generally of the order of 1/50 second, does not permit observation, as a bottle passes, of a monitoring signal during a time of one to five milliseconds, so that the container monitoring rate is limited to a few thousand containers per hour; however, modern production lines must permit monitoring above that rate, for example up to 50,000 bottles per hour.

SUMMARY OF THE INVENTION

The present invention seeks to obviate the above-mentioned disadvantages. More precisely, an object of the invention is in particular a method of monitoring the pressure in a vessel, receptacle or container, of the optical type, which however makes it possible to eliminate the main sources of disturbance of the optical monitoring signal. The invention has in particular as an object a method making it possible to obtain an optical monitoring signal which is significant with regard to its value, regular from one container to another, and distributed homogeneously in space, for example in the reference focal plane at right angles to the monitoring beam.

The present invention also has an object a method for the continuous monitoring of containers of the aforesaid type, which permits high rates while ensuring effective monitoring of each individual container.

According to the present invention it has been found that these aims can be achieved through the cooperation of the two following means:

on the one hand, a diffusing support is disposed transversely, for example at right angles, in the monitoring beam, this diffusing support passing in particular through the reference focal point determined, as previously, by the pre-established value of the difference in pressure between the interior of the vessel and the outside; in this way the physical magnitude of the monitoring beam received consists of a spot of light spreading out to a greater or lesser extent in the diffusing support, particularly around the reference focal point;

and, on the other hand, on the other side of the diffusing support in relation to the monitoring member such as for example the cap of the container being monitored, the image formed by the spot of light is received (for example in a video camera), in at least one dimension of said spot, so as to obtain a video signal representing the pressure prevailing in said container.

This video signal can then be processed to obtain an electric monitoring signal representing the spot of light on the diffusing support and therefore the difference in pressure between the interior of the vessel and the outside, for example representing the partial vacuum in a container.

By "diffusing support" is understood a rigid plane surface absorbing and at the same time distributing the light intercepted in the monitoring beam and corresponding to the concentrated or even punctiform image of the substantially flat monitoring member, for example the cap of a container; as described below, it may for example consist of an association of sandblasted glass and ground glass.

According to the invention it has been found that the two aforesaid means cooperate in the following manner:

the spot of light obtained in the diffusing support consists generally of a concentrated image of the flat monitoring member, particularly the cap, for example of the order of 2 to 4 millimeters in diameter; the diffusing support makes it possible to homogenize all the point or local differences of the monitoring signal thus received, which are caused by the various disturbances mentioned previously; the support, so as to speak, levels or averages out all these differences, while integrating them (in the mathematical sense of this word) to obtain a spot of light distributed, in respect of its intensity, in a "gaussian" manner in a plane passing through the optical axis of the monitoring beam;

on the other side of the diffusing support, in the observation dimension of the video camera, the spot of light has a total intensity sufficient to produce an image in the video camera, or each of its photosensitive elements, over a relatively long range, for example of the order of forty millimetres, which is done with a relatively short exposure time, for example of the order of 1.2 milliisecond; the video signal obtained in this way represents the totality—and not a random discretionary part—of the light spot and therefore of the optical monitoring signal.

In practice it is not essential for the diffusing support to be disposed at the reference focal point, that is to say to pass through the latter, since this support permits homogenization of the optical signal irrespective of its position. However, in practice, it is of course convenient to dispose this support at or near a reference focal point.

All in all, the video signal is effectively representative of the optical monitoring signal and therefore of the pressure in the container; it can therefore be used in an industrial environment for continuous monitoring, including monitoring at high rates, particularly without synchronization between the passage of the bottle and the measurement or monioring of the pressure.

Furthermoree, in order to adjust the sensitivity of monitoring or measurement it is possible to adjust the intensity of the incident illumination, instead of adjusting the threshold or gain of the video camera, so that the latter can always be used within its optimum operating range.

BRIEF DESCRIPTION OF THE DRAWINGS

The present invention will now be described with reference to the accompanying drawings, in which:

FIG. 2 shows the spot of light received on the diffusing support forming part of the apparatus according to the invention and representing the internal pressure of the containers monitored;

FIG. 3 shows schematically the method of processing the spot of light received on the diffusing support and representing the internal pressure of the containers in order to obtain finally an output signal utilizable for monitoring purposes.

DESCRIPTION OF THE EMBODIMENT

Figure 1:
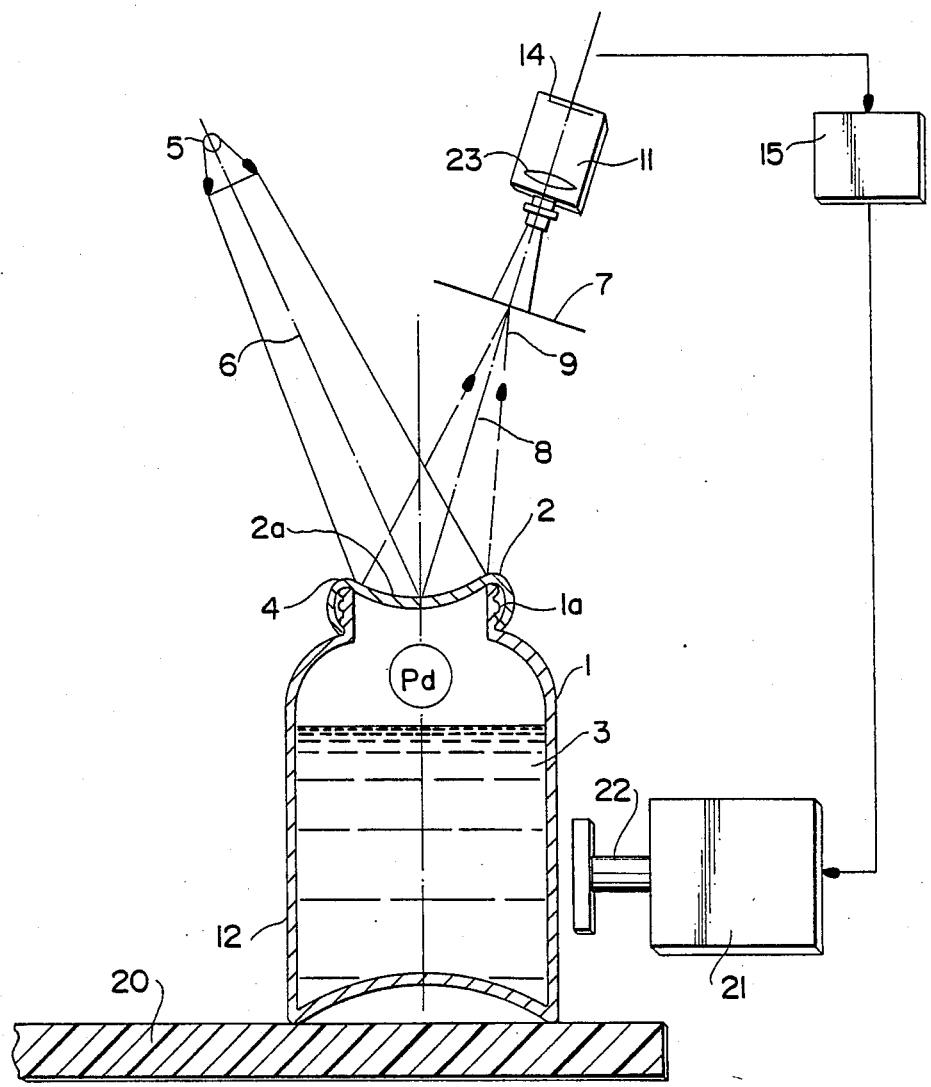
FIG. 1 shows schematically a monitoring apparatus according to the present invention, associated with a conveyor carrying containers whose internal pressure (partial vacuum) is continuously monitored; this figure also explains the monitoring method according to the present invention.

According to FIG. 1 the containers (12) treated and monitored each consist of a glass bottle (1) filled with a liquid (3), such as a fruit juice. Each container is closed by a thin metal cap (2) screwed leaktightly with the aid of a seal (4) onto the outside of the neck (1a). Each container monitored must be under partial (2a) of the cap (2) situated in the opening of the neck (1a) is deformed to form a hollow regular concave curvature.

For the purposes of the following description the following terms are completely equiivalent:
"vessel", "receptacle" and "container";
"cover", "cap" and "monitoring member",
each of the last-mentioned components being substantially flat, separating the interior of a vessel from the outside and being adapted to curve, as previously described, through the action of the difference in pressure between the interior of the vessel and the outside.

In order to monitor continuously the internal pressure of the containers (12), the latter are conveyed, and therefore displaced in a translatory movement, by a conveyor (20), which is shown schematically in FIG. 1. This conveyor moves at right angles to the plane of FIG. 1. Consequently, each container (1) is moved in succession past the monitoring apparatus according to the invention, which is described below, and in particular past the incident light beam, reference (6) in the following description. As each container (1) passes, the apparatus according to the invention delivers a video signal, which is given the reference (13) in FIG. 3 and is used as or converted into a monitoring signal (19) (still referring to FIG. 3). This monitoring signal, discriminated in appropriate manner, for example by comparison with a predetermined threshold, makes it possible to eliminate defective containers by means of a system (21) provided with a pusher (22) and disposed at the side of the conveyor (20) to enable each defective container to be moved to an appropriate outlet.

The monitoring apparatus proper according to the present invention comprises firstly an optical system consisting of the following components or members:

(a) a collimated light source (5), comprised of a lamp emitting an intense light, for example a halogen lamp with built-in reflector; this source directs a highly concentrated light beam (6) onto the previously defined monitoring member or zone (2a), with an incidence very close to the axis of symmetry of the container (1) and consequently of the cap (2a); a monitoring light beam is thus obtained which is in the form of the reflected light beam (8), it being understood that a monitoring beam could be obtained by appropriate optical means from the reflected beam and/or the reacted beam in the case of a transparent cap;

(b) a transducer (7) comprised of a diffusing support, disposed transversely in the monitoring beam (8), more precisely at right angles to the optical axis of the reflected beam (8); this diffusing support passes through or close to a reference focal point (9) determined by the reflection and focusing of the reflected beam (8), through the action of the concavity of the monitoring member (2a), for the pre-established value (Pd) of the partial vacuum in each container (1); according to FIG. 2, through the action of the various disturbances or variations occurring in practice and in industrial environments for the continuous monitoring of these containers, a relatively concentrated light spot (10) is obtained on the diffusing support (7), for example a spot having a diameter of the order of four milli-meters, which spreads out to a greater or lesser extent around the reference focal point (9); according to the invention it is this light spot (10) that is selected for optical monitoring, and, as described and defined later on, it is the total luminous intensity of this spot that is taken a monitoring parameter or physical quantity;

(c) a receiver (11) receiving the light spot (10), and comprised of a video camera disposed in the optical axis of the reflected beam (8), on the other side of the diffusing support (7) in relation to the monitoring member (2a); the camera observes the light spot (10) and thus develops an image of the latter in order to supply a video signal (13) (see FIG. 3) which, as described below, represents the pressure prevailing in each container (1); more precisely, the video camera is a video analyser of the image obtained of the light spot (10) along a dimension or line included in the plane of FIGS. 1 and 3 and at right angles to the optical axis of the reflected beam (8); this video camera comprises schematically an optical system (23) and an array (14) of discretionary photosensitive cells aligned in said dimension or direction and therefore corresponding to the direction of observation;

(d) a means (15), shown schematically in FIGS. 1 and 3, enabling the video signal (13) to be obtained from the linear image of the light spot (10) received by the camera, and making it possible to convert this video signal into an electric monitoring signal (19) and to utilize this signal as voltage or current to operate the ejection device (21) by simple detection or by comparison with a pre-established threshold.

The diffusing support (7) may be obtained by super imposing a glass having one ground face and another glass having one sandblasted face, the ground face being laid against the sandblasted face. The ground glass absorbs and gives a concentrated image of the flexible portion (2a) of the cap (2) (including details, such as printing), and the sandblasted glass diffuses the light of the concentrated image to make it homogeneous in respect of luminous intensity, with very regular distribution.

According to FIG. 3 the camera, or video image analyser, comprises an optical system with lens (23) and an array of photoelectrical cells (25) of elementary square shape and of very small dimensions (of the order of ten to thirteen microns in side length); this array (25)

produces a linear field of vision (26) of larger dimensions than the diameter of the concentrated light spot (10), as shown enlarged in FIG. 3. The array may comprise, over a length of five milli-meters, five hundred and twelve of said photoelectric cells, providing a linear image of 512 pixels.

The means (15) shown schematically in FIG. 1 and in detail in FIG. 3, may either be incorporated in the camera or attached to the outside of the latter, without any significant differences being entailed. This means comprises:

a scanning system (16), working for example at a rate of 800 Hz, connected separately to each photosensitive cell of the array (14) and supplying a video signal (13) formed by the development of the different electric intensities generated by the different photosensitive cells of the array, proportionately to the total distributed luminous intensity of the optical signal constituted by the spot (10). As previously discussed, and for the same reasons, this video signal has a "gaussian" form;

a means (17) for centering the video signal (13), making it possible to cut the latter at mid-height, to amplify it, and to shape it, in order to obtain an electric signal (19) having a square shape, with a height H and a width d, corresponding to the selected cut of the video signal; this electric signal can be used as voltage or as current. Finally, the electric signal (19) is detected by the means (18) or compared in the latter to obtain a monitoring signal of analog or digital type, which is transmitted to the ejection system (21).

The light source (5) must have the greatest possible intensity, in order to obtain a monitoring beam (8) relatively insensitive to the colors of the flat cap (2), and also in order to be able to make very rapid observations or measurements. If necessary, the monitoring optical signal can be processed optically before reaching the support (7) or the camera, for example in order to eliminate certain interference wavelengths.

With the aid of the apparatus according to the invention, the concentrated light spot (10) obtained on the diffusing support (7) is representative of the negative pressure existing inside each container (12):

if there is no negative pressure, the interior of the bottle is in equilibrium with the pressure of the outside atmosphere and the portion (2a) of the cap (2) is then flat and horizontal; no light spot is then obtained on the support (7), or the light spot is far too diffused in relation to the dimensions of said support; in both cases nothing can be seen by the camera if the negative pressure inside the bottle (1) is equal to the reference value (Pd), the curvature of the portion (2a) assumes a predetermined concavity corresponding to the focusing of the reflected beam (8) onto the support 7 and forming the concentrated light spot (10), taking into account any disturbances encountered in practice; the camera can then observe and analyse this light spot, and thus a monitoring signal is obtained at the outlet of the system (15);

if the negative pressure in the container (1) fluctuates around the reference value (Pd), the circular light spot (10) will have a varying radius and will represent the variation of pressure inside the container (1).

As previously indicated, with continuous monitoring, the detected signal, compared in the means (18), is used to discriminate a container (1) having the pre-established value of internal pressure, corresponding to the obtaining of a concentrated light spot on the support (7), from a container not having this pre-established value and for which no light spot can be analyzed by the camera. More precisely, according to the invention a positive check is made, which means that the maximum value H of the electric output signal (19) is detected to monitor the containers in which the pressure is correct, while the absence of this monitoring signal entails the ejection of the defective container.

The same principles as those defined above can be used to monitor a container in which the nominal internal pressure must exceed atmospheric pressure, and for example to determine a convex shape of the cap (2). In this case it is sufficient to dispose a lens or other equivalent means in the optical path of the reflected beam (8) to obtain a monitoring beam which once again has the charcteristics described above and which permits the same monitoring or the same measurement inside the container (1).

I claim:

1. A process for monitoring pressure prevailing in a vessel delimited by a rigid exterior wall in which a substantially flat monitoring member is provided which is adapted to curve through the action of a difference in pressure between the interior of said vessel and the outside, comprising:
    (a) directing an incident light beam onto the monitoring member, thereby producing a monitoring light beam emitted from the monitoring member;
    (b) training the monitoring light beam on a diffusing support located at or near a reference focal point determined by a pre-established value of a difference in pressure between the interior of the vessel and the outside, to form a spot of light on the diffusing support; and
    (c) receiving an image formed by the spot of light in at least one dimension of said spot on the other side of the diffusing support in relation to the monitoring member and producing from said image a video signal representing the pressure prevailing in said vessel.

2. A process as claimed in claim 1, wherein said monitoring light beam is obtained from reflection of said incident light beam from said monitoring member.

3. A process as claimed in claim 1, wherein said monitoring light beam is obtained from refraction of said incident light beam through said monitoring member.

4. A process as claimed in claim 1, wherein the video signal is converted into an electric montoring signal.

5. A process as claimed in claim 1, wherein the monitoring signal is used to discriminate a vessel having the pre-established value of the difference in pressure between the inside and the outside, from a vessel not having said preestablished value.

6. A process as claimed in claim 5, wherein the monitoring signal corresponds to the maximum electric output value obtained for the pre-established value of the difference in pressure.

7. A process as claimed in claim 1, wherein:
    said vessel is a container whose contents must be kept under partial vacuum;
    said container has an opening leaktightly closed by a cover adapted to curve toward the interior of the container in dependence on the partial vacuum, said cover serving as said monitoring member;
    a plurality of said containers is displaced in a translatory movement;
    each container is passed in succession under the incident light beam; and the video signal is used to enable defective containers to be eliminated.

8. An apparatus for monitoring pressure prevailing in a vessel delimited by a rigid exterior wall in which a substantially flat monitoring member is provided which is adapted to curve through the action of a difference in pressure between the interior of said vessel and the outside, said apparatus comprising:
  (a) a light source for directing an incident light beam onto the monitoring member and for producing a monitoring light beam emitted from the monitoring member;
  b) a diffusing support disposed transversely in the monitoring light beam at or near a reference focal point determined by a pre-established value of a difference in pressure between the interior of the vessel and the outside; and
  (c) a video camera disposed on the other side of the diffusing support in relation to the monitoring member and configured to observe a light spot formed in the diffusing support by the monitoring light beam and to supply a video signal representing the pressure prevailing in said receptacle.

9. An apparatus as claimed in claim 8, wherein said monitoring light beam is obtained from reflection of said incident light beam from said monitoring member.

10. An apparatus as claimed in claim 8, wherein said monitoring light beam is obtained from refraction of said incident light beam through said monitoring member.

11. An apparatus as claimed in claim 8, wherein the video camera observes the image of the light spot in at least one dimension of observation of the light spot.

12. An apparatus as claimed in claim 11, wherein the video camera includes an array of photo-sensitive cells aligned in the direction of observation.

13. An apparatus as claimed in claim 11, wherein the video camera includes means for converting the video signal into an electric monitoring signal.

* * * * *